US012183297B2

(12) United States Patent
Zhang

(10) Patent No.: US 12,183,297 B2
(45) Date of Patent: Dec. 31, 2024

(54) DISPLAY COMPENSATION METHOD AND DEVICE, AND DISPLAY PANEL

(71) Applicant: TCL CHINA STAR OPTOELECTRONICS TECHNOLOGY CO., LTD., Shenzhen (CN)

(72) Inventor: Yonglei Zhang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/600,416

(22) PCT Filed: Aug. 10, 2021

(86) PCT No.: PCT/CN2021/111897
§ 371 (c)(1),
(2) Date: Sep. 30, 2021

(87) PCT Pub. No.: WO2023/000410
PCT Pub. Date: Jan. 26, 2023

(65) Prior Publication Data

US 2024/0054967 A1 Feb. 15, 2024

(30) Foreign Application Priority Data

Jul. 19, 2021 (CN) ......................... 202110812401.7

(51) Int. Cl.
*G09G 3/36* (2006.01)

(52) U.S. Cl.
CPC ......... *G09G 3/3607* (2013.01); *G09G 3/3611* (2013.01); *G09G 3/36* (2013.01);
(Continued)

(58) Field of Classification Search
CPC ............... G09G 3/3607; G09G 3/3611; G09G 2320/0242; G09G 2320/0233;
(Continued)

(56) References Cited

U.S. PATENT DOCUMENTS

2009/0135211 A1* 5/2009 Wang ....................... G09G 3/20 345/690
2011/0102423 A1* 5/2011 Nam .................... H04N 13/317 345/419
(Continued)

FOREIGN PATENT DOCUMENTS

CN 104036715 A 9/2014
CN 105551416 A 5/2016
(Continued)

OTHER PUBLICATIONS

Chinese Office Action issued in corresponding Chinese Patent Application No. 202110812401.7 dated Feb. 18, 2022, pp. 1-7.
(Continued)

*Primary Examiner* — William Boddie
*Assistant Examiner* — Saifeldin E Elnafia
(74) *Attorney, Agent, or Firm* — PV IP PC; Wei Te Chung

(57) ABSTRACT

The present disclosure provides a display compensation method and device, and a display panel. The display compensation method includes: determining a central pixel column, a first pixel column, a second pixel column, a third pixel column, and a fourth column, in a predetermined direction; determining a target pixel area according to grayscale values of pixel units contained in each pixel column; and adjusting the grayscale value of each pixel unit in the target pixel area to be equal to one actual grayscale value of a picture to be displayed.

19 Claims, 3 Drawing Sheets

(52) U.S. Cl.
CPC ............... *G09G 2320/0233* (2013.01); *G09G 2320/0242* (2013.01); *G09G 2320/0271* (2013.01); *G09G 2320/0276* (2013.01); *G09G 2320/028* (2013.01); *G09G 2360/16* (2013.01)

(58) Field of Classification Search
CPC ..... G09G 2320/0271; G09G 2320/028; G09G 3/36; G09G 2320/0276; G09G 2360/16
See application file for complete search history.

(56) References Cited

U.S. PATENT DOCUMENTS

| | | | | |
|---|---|---|---|---|
| 2011/0221760 | A1* | 9/2011 | Irie | H04N 5/202 345/589 |
| 2016/0247434 | A1* | 8/2016 | Wang | G09G 3/2074 |
| 2017/0161882 | A1 | 6/2017 | Mantiuk et al. | |
| 2018/0330682 | A1* | 11/2018 | Zhang | G09G 3/22 |
| 2019/0156772 | A1 | 5/2019 | Yabuki | |
| 2019/0265552 | A1 | 8/2019 | Shiomi | |
| 2020/0013348 | A1* | 1/2020 | Lee | G09G 3/3406 |
| 2020/0098324 | A1 | 3/2020 | Li et al. | |

FOREIGN PATENT DOCUMENTS

| | | | |
|---|---|---|---|
| CN | 106663313 | A | 5/2017 |
| CN | 108133692 | A | 6/2018 |
| CN | 207966994 | U | 10/2018 |
| CN | 109313878 | A | 2/2019 |
| CN | 109686263 | A | 4/2019 |
| CN | 109937444 | A | 6/2019 |
| CN | 110689855 | A | 1/2020 |
| CN | 111028695 | A | 4/2020 |
| CN | 111292701 | A | 6/2020 |
| CN | 111640394 | A | 9/2020 |
| JP | H10301092 | A | 11/1998 |
| JP | 2010169868 | A | 8/2010 |
| JP | 2015011322 | A | 1/2015 |
| JP | 2015222328 | A | 12/2015 |
| JP | 2020034876 | A | 3/2020 |
| KR | 20180062332 | A | 6/2018 |
| WO | 2013008282 | A1 | 1/2013 |

OTHER PUBLICATIONS

International Search Report in International application No. PCT/CN2021/111897, mailed on Mar. 28, 2022.

Written Opinion of the International Search Authority in International application No. PCT/CN2021/111897, mailed on Mar. 28, 2022.

Japanese Office Action issued in corresponding Japanese Patent Application No. 特願2021-547449 dated Sep. 21, 2023, pp. 1-2.

Japanese Office Action issued in corresponding Japanese Patent Application No. 特願2021-547449 dated Jul. 9, 2024, pp. 1-5.

* cited by examiner

DISPLAY COMPENSATION METHOD AND DEVICE, AND DISPLAY PANEL

This application is a Notional Phase of PCT Patent Application No. PCT/CN2021/111897 having international filing date of Aug. 10, 2021, which claims priority to a Chinese Patent Application No. 202110812401.7, titled "DISPLAY COMPENSATION METHOD AND DEVICE, AND DISPLAY PANEL" and filed to the Chinese Patent Office on Jul. 19, 2021, the entire content of which is incorporated in its entirety by reference herein.

FIELD OF INVENTION

The present disclosure relates to the technical field of display, and specifically to a display compensation method and device, and a display panel.

BACKGROUND OF INVENTION

With development of display technology, size of liquid crystal display (LCD) has become larger and larger. For a large-size liquid crystal display, its viewing angle parameter is especially important. Currently, use of view angle compensation (VAC) technology in the liquid crystal display to compensate a visual angle of the liquid crystal display has become an important means to achieve a large viewing angle. A key to the VAC technology is to use a combination of high-grayscale pixels and low-grayscale pixels to achieve an intermediate grayscale image display. This method has obvious advantages in improving the display viewing angle.

However, the VAC technology will cause a single pixel to be greenish or purplish. On the whole, a picture displayed on the LCD screen appears colored-oblique-line phenomenon. Namely, the picture displayed on the LCD screen appears a colored oblique line extending at a specific angle (such as 45 degrees or 135 degrees), affecting the display effect.

SUMMARY OF INVENTION

There is currently a technical problem of a colored oblique line in liquid crystal display screens by adopting VAC technology.

The present disclosure is to provide a display compensation method and device, and a display panel, which are used to alleviate a technical problem of a colored oblique line in current liquid crystal display screens.

The present application provides a display compensation method, which is applied to a display panel including a plurality of pixel units, wherein the display compensation method includes:

selecting a pixel region within the display panel, wherein the pixel region includes a part of the plurality of pixel units;

determining a central pixel unit located at a central position of the pixel region;

determining a central pixel column including the central pixel unit, a first pixel column and a second pixel column located on opposite sides of the central pixel column, a third pixel column located on one side of the first pixel column away from the central pixel column, and a fourth pixel column located on one side of the second pixel column away from the central pixel column, in a predetermined direction;

determining a target pixel area according to grayscale values of the pixel units contained in the central pixel column, the first pixel column, the second pixel column, the third pixel column, and the fourth pixel column;

adjusting the grayscale value of each pixel unit in the target pixel area so that the grayscale value of each pixel unit in the target pixel area is equal to one actual grayscale value of a picture to be displayed.

In the display compensation method of the present disclosure, a step of determining the target pixel area according to the grayscale values of the pixel units contained in the central pixel column, the first pixel column, the second pixel column, the third pixel column, and the fourth pixel column includes:

acquiring a current grayscale value of each pixel unit in the central pixel column; and determining whether the current grayscale value of each pixel unit in the central pixel column is equal to each other.

In the display compensation method of the present disclosure, the step of determining the target pixel area according to the grayscale values of the pixel units contained in the central pixel column, the first pixel column, the second pixel column, the third pixel column, and the fourth pixel column further includes:

acquiring a current grayscale value of each pixel unit in the first pixel column;

determining whether the current grayscale value of each pixel unit in the first pixel column is equal to each other.

In the display compensation method of the present disclosure, the step of determining the target pixel area according to the grayscale values of the pixel units contained in the central pixel column, the first pixel column, the second pixel column, the third pixel column, and the fourth pixel column further includes:

acquiring a current grayscale value of each pixel unit in the second pixel column; and determining whether the current grayscale value of each pixel unit in the second pixel column is equal to each other.

In the display compensation method of the present disclosure, the step of determining the target pixel area according to the grayscale values of the pixel units contained in the central pixel column, the first pixel column, the second pixel column, the third pixel column, and the fourth pixel column further includes:

acquiring a current grayscale value of each pixel unit in the third pixel column; and determining whether the current grayscale value of each pixel unit in the third pixel column is equal to each other.

In the display compensation method of the present disclosure, the step of determining the target pixel area according to the grayscale values of the pixel units contained in the central pixel column, the first pixel column, the second pixel column, the third pixel column, and the fourth pixel column further includes:

acquiring a current grayscale value of each pixel unit in the fourth pixel column; and determining whether the current grayscale value of each pixel unit in the fourth pixel column is equal to each other.

In the display compensation method of the present disclosure, the step of determining the target pixel area according to the grayscale values of the pixel units contained in the central pixel column, the first pixel column, the second pixel column, the third pixel column, and the fourth pixel column further includes:

when the current grayscale value of each pixel unit in the central pixel column is equal to each other, and the current grayscale value of each pixel unit in the first pixel column is equal to each other, and the current grayscale value of each pixel unit in the second pixel column is equal to each other, and the current grayscale value of each pixel unit in the third pixel column is equal to each other, and the current grayscale value of each pixel unit in the fourth pixel column is equal to each other, comparing a size relationship between the current grayscale value of anyone pixel unit in the first pixel column and the current grayscale value of anyone pixel unit in the fourth pixel column; and comparing a size relationship between the current grayscale value of anyone pixel unit in the second pixel column and the current grayscale value of anyone pixel unit in the third pixel column.

In the display compensation method of the present disclosure, the step of determining the target pixel area according to the grayscale values of the pixel units contained in the central pixel column, the first pixel column, the second pixel column, the third pixel column, and the fourth pixel column further includes:

when the current grayscale value of each pixel unit in the central pixel column is equal to each other, and the current grayscale value of each pixel unit in the first pixel column is equal to each other, and the current grayscale value of each pixel unit in the second pixel column is equal to each other, and the current grayscale value of each pixel unit in the third pixel column is equal to each other, and the current grayscale value of each pixel unit in the fourth pixel column is equal to each other, and when the current grayscale value of anyone pixel unit in the first pixel column and the current grayscale value of anyone pixel unit in the fourth pixel column are not equal, and when the current grayscale value of anyone pixel unit in the second pixel column and the current grayscale value of anyone pixel unit in the third pixel column are not equal, determining, the central pixel column, the first pixel column, the second pixel column, the third pixel column, and the fourth pixel column, as the target pixel area.

In the display compensation method of the present disclosure, each of the pixel units includes a first sub-pixel, a second sub-pixel, and a third sub-pixel;

the step of determining whether the current grayscale value of each pixel unit in the central pixel column is equal to each other includes:

comparing the current grayscale value of the first sub-pixel contained in each pixel unit in the central pixel column;

comparing the current grayscale value of the second sub-pixel contained in each pixel unit in the central pixel column;

comparing the current grayscale value of the third sub-pixel contained in each pixel unit in the central pixel column; and when the current grayscale value of the first sub-pixel contained in each pixel unit in the central pixel column is equal to each other, and the current grayscale value of the second sub-pixel contained in each pixel unit in the central pixel column is equal to each other, and the current grayscale value of the third sub-pixel contained in each pixel unit in the central pixel column is equal to each other, determining the current grayscale value of each pixel unit in the central pixel column being equal to each other.

In the display compensation method of the present disclosure, each of the pixel units includes a first sub-pixel, a second sub-pixel, and a third sub-pixel;

the step of determining whether the current grayscale value of each pixel unit in the first pixel column is equal to each other includes:

comparing the current grayscale value of the first sub-pixel contained in each pixel unit in the first pixel column with each other;

comparing the current grayscale value of the second sub-pixel contained in each pixel unit in the first pixel column with each other;

comparing the current grayscale value of the third sub-pixel contained in each pixel unit in the first pixel column with each other; and when the current grayscale value of the first sub-pixel contained in each pixel unit in the first pixel column is equal to each other, and the current grayscale value of the second sub-pixel contained in each pixel unit in the first pixel column is equal to each other, and the current grayscale value of the third sub-pixel contained in each pixel unit in the first pixel column is equal to each other, determining the current grayscale value of each pixel unit in the first pixel column being equal to each other.

In the display compensation method of the present disclosure, each of the pixel units includes a first sub-pixel, a second sub-pixel, and a third sub-pixel;

the step of determining whether the current grayscale value of each pixel unit in the second pixel column is equal to each other includes:

comparing the current grayscale value of the first sub-pixel contained in each pixel unit in the second pixel column with each other;

comparing the current grayscale value of the second sub-pixel contained in each pixel unit in the second pixel column with each other;

comparing the current grayscale value of the third sub-pixel contained in each pixel unit in the second pixel column with each other; and when the current grayscale value of the first sub-pixel contained in each pixel unit in the second pixel column is equal to each other, and the current grayscale value of the second sub-pixel contained in each pixel unit in the second pixel column is equal to each other, and the current grayscale value of the third sub-pixel contained in each pixel unit in the second pixel column is equal to each other, determining the current grayscale value of each pixel unit in the second pixel column being equal to each other.

In the display compensation method of the present disclosure, each of the pixel units includes a first sub-pixel, a second sub-pixel, and a third sub-pixel;

the step of determining whether the current grayscale value of each pixel unit in the third pixel column is equal to each other includes:

comparing the current grayscale value of the first sub-pixel contained in each pixel unit in the third pixel column with each other;

comparing the current grayscale value of the second sub-pixel contained in each pixel unit in the third pixel column with each other;

comparing the current grayscale value of the third sub-pixel contained in each pixel unit in the third pixel column with each other; and when the current grayscale value of the first sub-pixel contained in each pixel unit in the third pixel column is equal to each other, and the current grayscale value of the second sub-pixel contained in each pixel unit in the third pixel column is equal to each other, and the current grayscale value of the third sub-pixel contained in each pixel unit in the third pixel column is equal to each other, determining the current grayscale value of each pixel unit in the third pixel column being equal to each other.

In the display compensation method of the present disclosure, each of the pixel units includes a first sub-pixel, a second sub-pixel, and a third sub-pixel;

the step of determining whether the current grayscale value of each pixel unit in the fourth pixel column is equal to each other includes:

comparing the current grayscale value of the first sub-pixel contained in each pixel unit in the fourth pixel column with each other;

comparing the current grayscale value of the second sub-pixel contained in each pixel unit in the fourth pixel column with each other;

comparing the current grayscale value of the third sub-pixel contained in each pixel unit in the fourth pixel column with each other; and when the current grayscale value of the first sub-pixel contained in each pixel unit in the fourth pixel column is equal to each other, and the current grayscale value of the second sub-pixel contained in each pixel unit in the fourth pixel column is equal to each other, and the current grayscale value of the third sub-pixel contained in each pixel unit in the fourth pixel column is equal to each other, determining the current grayscale value of each pixel unit in the fourth pixel column being equal to each other.

In the display compensation method of the present disclosure, each of the pixel units comprises a first sub-pixel, a second sub-pixel, and a third sub-pixel;

the step of comparing the size relationship between the current grayscale value of anyone pixel unit in the first pixel column and the current grayscale value of anyone pixel unit in the fourth pixel column includes:

comparing the current grayscale value of the first sub-pixel contained in anyone pixel unit in the first pixel column with the current grayscale value of the first sub-pixel contained in anyone pixel unit in the fourth pixel column;

comparing the current grayscale value of the second sub-pixel contained in anyone pixel unit in the first pixel column with the current grayscale value of the second sub-pixel contained in anyone pixel unit in the fourth pixel column; and comparing the current grayscale value of the third sub-pixel contained in anyone pixel unit in the first pixel column with the current grayscale value of the third sub-pixel contained in anyone pixel unit in the fourth pixel column.

In the display compensation method of the present disclosure, the step of comparing the size relationship between the current grayscale value of anyone pixel unit in the first pixel column and the current grayscale value of anyone pixel unit in the fourth pixel column further includes:

when the current grayscale values of the first sub-pixels contained in the pixel units in the first pixel column and the current grayscale values of the first sub-pixels contained in the pixel units in the fourth pixel column are not equal, and the current grayscale values of the second sub-pixels contained in the pixel units in the first pixel column and the current grayscale values of the second sub-pixels contained in the pixel units in the fourth pixel column are not equal, and the current grayscale values of the third sub-pixels contained in the pixel units in the first pixel column and the current grayscale values of the third sub-pixels contained in the pixel units in the fourth pixel column are not equal, determining the current grayscale value of anyone pixel unit in the first pixel column not equal to the current grayscale value of anyone pixel unit in the fourth pixel column.

In the display compensation method of the present disclosure, each of the pixel units comprises a first sub-pixel, a second sub-pixel, and a third sub-pixel;

the step of comparing the size relationship between the current grayscale value of anyone pixel unit in the second pixel column and the current grayscale value of anyone pixel unit in the third pixel column includes:

comparing the current grayscale value of the first sub-pixel contained in anyone pixel unit in the second pixel column with the current grayscale value of the first sub-pixel contained in anyone pixel unit in the third pixel column;

comparing the current grayscale value of the second sub-pixel contained in anyone pixel unit in the second pixel column with the current grayscale value of the second sub-pixel contained in anyone pixel unit in the third pixel column; and comparing the current grayscale value of the third sub-pixel contained in anyone pixel unit in the second pixel column with the current grayscale value of the third sub-pixel contained in anyone pixel unit in the third pixel column.

In the display compensation method of the present disclosure, the step of comparing the size relationship between the current grayscale value of anyone pixel unit in the second pixel column and the current grayscale value of anyone pixel unit in the third pixel column further includes:

when the current grayscale values of the first sub-pixels contained in the pixel units in the second pixel column and the current grayscale values of the first sub-pixels contained in the pixel units in the third pixel column are not equal, and the current grayscale values of the second sub-pixels contained in the pixel units in the second pixel column and the current grayscale values of the second sub-pixels contained in the pixel units in the third pixel column are not equal, and the current grayscale values of the third sub-pixels contained in the pixel units in the second pixel column and the current grayscale values of the third sub-pixels contained in the pixel units in the third pixel column are not equal, determining the current grayscale value of anyone pixel unit in the second pixel column not equal to the current grayscale value of anyone pixel unit in the third pixel column.

The present disclosure also provides a display compensation device, which is applied to a display panel including a plurality of pixel units, wherein the display compensation device includes:

a selection module configured to select a pixel region within the display panel, wherein the pixel region comprises a part of the plurality of pixel units;

- a first determination module configured to determine a central pixel unit located at a central position of the pixel region;
- a second determination module configured to determine a central pixel column including the central pixel unit, a first pixel column and a second pixel column located on opposite sides of the central pixel column, a third pixel column located on one side of the first pixel column away from the central pixel column, and a fourth pixel column located on one side of the second pixel column away from the central pixel column, in a predetermined direction;
- a third determination module configured to determine a target pixel area according to grayscale values of the pixel units contained in the central pixel column, the first pixel column, the second pixel column, the third pixel column, and the fourth pixel column; and
- an adjustment module configured to adjust the grayscale value of each pixel unit in the target pixel area so that the grayscale value of each pixel unit in the target pixel area is equal to one actual grayscale value of a picture to be displayed.

The present disclosure also provides a display panel, which is used to perform a display process using the display compensation method as mentioned above.

In the display panel of the present disclosure, the display panel comprises a plurality of pixel units, and each of the pixel units comprises a first sub-pixel, a second sub-pixel, and a third sub-pixel.

The present disclosure provides a display compensation method and device, and a display panel. The display compensation method is applied in a display panel and includes: determining a central pixel unit within a pixel region; determining a central pixel column, a first pixel column, a second pixel column, a third pixel column, and a fourth pixel column, according to a position of the central pixel unit, in a predetermined direction; determining a target pixel area according to grayscale values of pixel units contained in the central pixel column, the first pixel column, the second pixel column, the third pixel column, and the fourth pixel column; and adjusting the grayscale value of each pixel unit in the target pixel area so that the grayscale value of each pixel unit in the target pixel area is equal to one actual grayscale value of a picture to be displayed. In the present disclosure, a plurality of pixel columns are determined according to the central pixel unit, and the target pixel area is determined according to the grayscale values of the pixel units in each pixel column. Then, the grayscale values of the pixel units in the target pixel area are adjusted to cause that the grayscale values of the pixel unit in the target pixel area are equal to the actual grayscale values of the picture to be displayed. The pixel compensation method can accurately determine a position of a colored oblique line in the display panel and adjust the grayscale values of the pixel units corresponding to the colored oblique line to alleviate an issue of the colored oblique line in a displayed picture.

BRIEF DESCRIPTION OF DRAWINGS

To explain embodiments or technical solutions in the prior art more clearly, drawings that need to be used in the description of the embodiments or the prior art will be briefly introduced as follows. Obviously, the drawings in the following description are only some embodiments of the present disclosure, those skilled in the art can obtain other drawings based on these drawings without creative work.

DETAILED DESCRIPTION OF PREFERRED EMBODIMENTS

Figure 1:
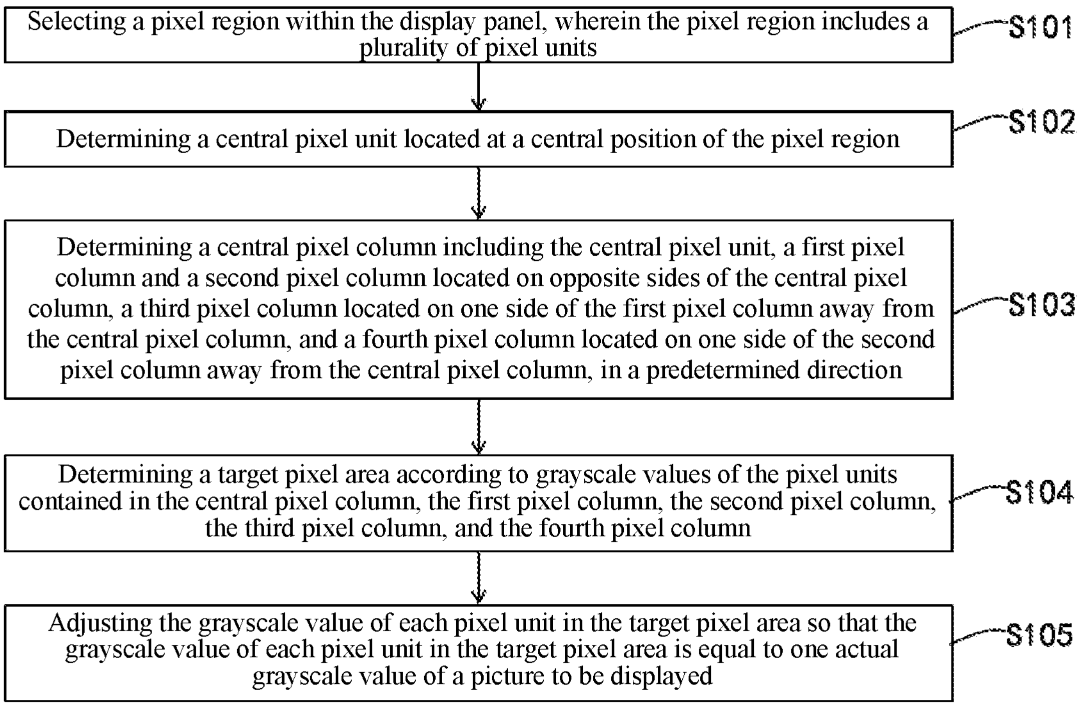
FIG. 1 is a flowchart of a display compensation method provided by an embodiment of the present disclosure.

The description of the following embodiments refers to the attached drawings to illustrate specific embodiments that can be implemented in the present disclosure. Directional terms mentioned in the present disclosure, such as "up," "down," "front," "back," "left," "right," "inner," "outer," and "side," are directions referred to the attached drawings. Therefore, the directional terms are used to illustrate and understand the present disclosure but not used to limit the present disclosure. In the figure, units with similar structures are indicated by the same reference numerals.

The embodiments of the present disclosure provide a display compensation method and device and a display panel. The display compensation method is applied to a display panel and includes: determining a central pixel unit within a pixel region, determining a central pixel column, a first pixel column, a second pixel column, a third pixel column, and a fourth pixel column in a predetermined direction according to a position of the central pixel unit, determining a target pixel area according to grayscale values of pixel units contained in the central pixel column, the first pixel column, the second pixel column, the third pixel column, and the fourth pixel column, and adjusting the grayscale value of each pixel unit in the target pixel area so that the grayscale value of each pixel unit in the target pixel area is equal to one actual grayscale value of a picture to be displayed. In the embodiments of the present disclosure, a plurality of pixel columns are determined according to the central pixel unit, and the target pixel area is determined according to the grayscale values of the pixel units in each pixel column. Then, the grayscale values of the pixel units in the target pixel area are adjusted to cause that the grayscale values of the pixel unit in the target pixel area are equal to the actual grayscale values of the picture to be displayed. The pixel compensation method can accurately determine a position of the colored oblique line in the display panel and adjust the grayscale values of the pixel units corresponding to the colored oblique line to alleviate an issue of the colored oblique line in a displayed picture.

Figure 2:
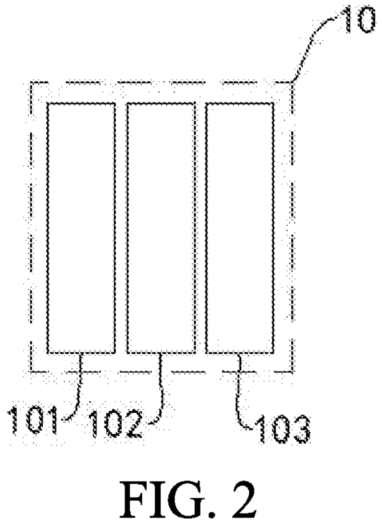
FIG. 2 is a schematic structural diagram of a pixel unit in a display panel provided by an embodiment of the present disclosure.
Figure 3:
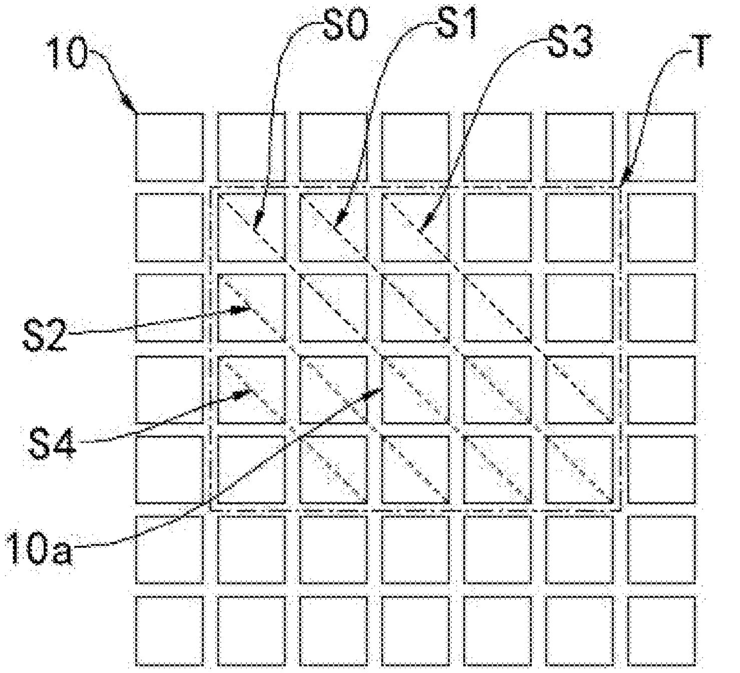
FIG. 3 is a first schematic diagram of a target pixel area determined in a display panel by using the display compensation method provided by an embodiment of the present disclosure.
Figure 4:
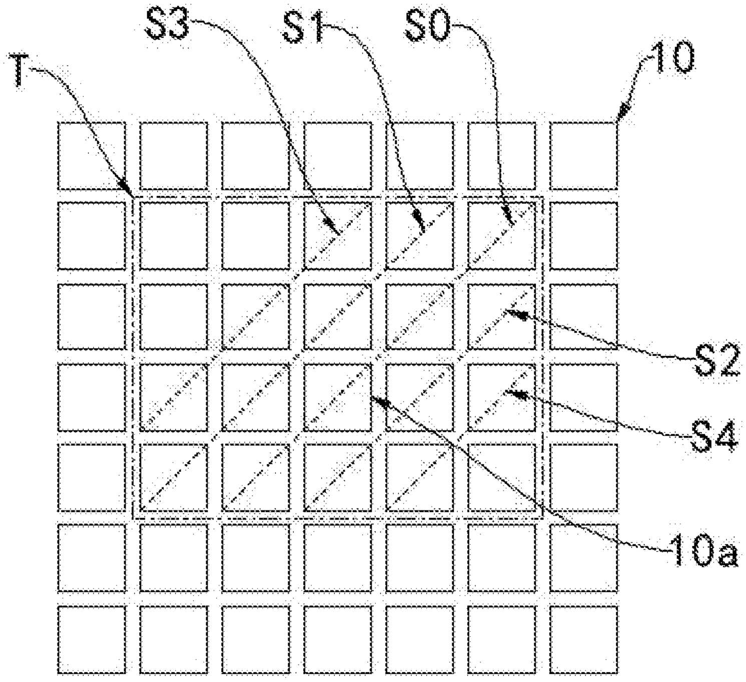
FIG. 4 is a second schematic diagram of the target pixel area determined in the display panel using the display compensation method provided by the embodiment of the present disclosure.

Please refer to FIGS. 1 to 4. FIG. 1 is a flowchart of a display compensation method provided by an embodiment of the present disclosure. FIG. 2 is a schematic structural diagram of a pixel unit in a display panel provided by an embodiment of the present disclosure. FIG. 3 is a first schematic diagram of a target pixel area determined in a display panel by using the display compensation method provided by an embodiment of the present disclosure. FIG. 4 is a second schematic diagram of the target pixel area determined in the display panel using the display compensation method provided by the embodiment of the present disclosure.

The display compensation method provided by the embodiment of the present disclosure is applied to a display panel having a pixel unit structure and an arrangement structure of the pixel units shown in FIGS. 2 to 4. The display panel includes a plurality of pixel units 10. Each of the pixel units 10 includes a first sub-pixel 101, a second sub-pixel 102, and a third sub-pixel 103. The first sub-pixel 101 is used to display a first color light, such as red light. The second sub-pixel 102 is used to display a second color light, such as green light. The third sub-pixel 103 is used to display a third color light, such as blue light.

In a step S101, a pixel region T is selected within the display panel, wherein the pixel region T includes a plurality of pixel units 10.

Specifically, the pixel region T is a pixel matrix area composed of n rows and m columns of pixel units 10, where n and m are both integers greater than 2.

Preferably, considering the factor of device cost, the pixel region T may be a pixel matrix area composed of four rows and five columns of pixel units 10, wherein the pixel region T includes twenty pixel units 10 in total.

In a step S102: a central pixel unit 10*a* located at a center of the pixel region T is determined.

Specifically, according to the number and arrangement rules of the pixel units included within the pixel region T. A method for determining the central pixel unit 10*a* may include:

- When both n and m are odd numbers, the central pixel unit 10*a* is selected from the pixel unit 10 at the (n+1)/2-th row and the (m+1)/2-th column within the pixel region T;
- When n is an odd number and m is an even number, the central pixel unit 10*a* is selected from the pixel unit 10 at the (n+1)/2-th row and the (m+2)/2-th column within the pixel region T;
- When n is an even number and m is an odd number, the central pixel unit 10*a* is selected from the pixel unit 10 at the (n+2)/2-th row and the (m+1)/2-th column within the pixel region T;
- When both n and m are even numbers, the central pixel unit 10*a* is selected from the pixel unit 10 in the (n+2)/2-th row and the (m+2)/2-th column within the pixel region T.

For example, when the pixel area T is a pixel matrix area composed of four rows and five columns of pixel units 10, the central pixel unit 10*a* is selected from the pixel unit 10 at the third row and the third column within the pixel region T.

In a step S103: a central pixel column S0 including the central pixel unit 10*a*, a first pixel column S1 and a second pixel column S2 located on opposite sides of the central pixel column S0, a third pixel column S3 located on one side of the pixel column S1 away from the central pixel column S0, and a fourth pixel column S4 located on one side of the second pixel column S2 away from the center pixel column S0, in a predetermined direction, are determined.

Optionally, the predetermined direction may be a direction that forms an angle of 135 degrees with a row direction of the pixel units 10 as shown in FIG. 3 or may be a direction that forms an angle of 45 degrees with the row direction of the pixel units 10 as shown in FIG. 4.

In a step S104, a target pixel area is determined according to grayscale values of pixel units 10 contained in the central pixel column S0, the first pixel column S1, the second pixel column S2, the third pixel column S3, and the fourth pixel column S4.

Specifically, the step S104 includes:

Obtaining a current grayscale value of each pixel unit 10 in the central pixel column S0, obtaining a current grayscale value of each pixel unit 10 in the first pixel column S1, obtaining a current grayscale value of each pixel unit 10 in the second pixel column S2, obtaining a current grayscale value of each pixel unit 10 in the third pixel column S3, and obtaining a current grayscale value of each pixel unit 10 in the fourth pixel column S4.

Determining whether the current grayscale value of each pixel unit 10 in the central pixel column S0 is equal to each other, determining whether the current grayscale value of each pixel unit 10 in the first pixel column S1 is equal to each other, determining whether the current grayscale value of each pixel unit 10 in the second pixel column S2 is equal to each other, determining whether the current grayscale value of each pixel unit 10 in the third pixel column S3 is equal to each other, and determining whether the current grayscale value of each pixel unit 10 in the fourth pixel column S4 is equal to each other.

When the current grayscale value of each pixel unit 10 in the central pixel column S0 is equal to each other, the current grayscale value of each pixel unit 10 in the first pixel column S1 is equal to each other, and the current grayscale value of each pixel unit 10 in the second pixel column S2 is equal to each other, and the current grayscale value of each pixel unit 10 in the third pixel column S3 is equal to each other, and the current grayscale value of each pixel unit 10 in the fourth pixel column S4 is equal to each other, comparing a size relationship between the current grayscale value of anyone pixel unit 10 in the first pixel column S1 and the current grayscale value of anyone pixel unit 10 in the fourth pixel column S4, and comparing a size relationship between the current grayscale value of anyone pixel unit 10 in the second pixel column S2 and the current grayscale value of anyone pixel unit 10 in the third pixel column S3.

When the current grayscale value of each pixel unit 10 in the central pixel column S0 is equal to each other, and the current grayscale value of each pixel unit 10 in the first pixel column S1 is equal to each other, and the current grayscale value of each pixel unit 10 in the second pixel column S2 is equal to each other, and the current grayscale value of each pixel unit 10 in the third pixel column S3 is equal to each other, and the current grayscale value of each pixel unit 10 in the fourth pixel column S4 is equal to each other, and when the current grayscale value of anyone pixel unit 10 in the first pixel column S1 and the current grayscale value of anyone pixel unit 10 in the fourth pixel column S4 are not equal, and when the current grayscale value of anyone pixel unit 10 in the second pixel column S2 and the current grayscale value of anyone pixel unit 10 in the third pixel column S3 are not equal, determining, the central pixel column S0, the first pixel column S1, the second pixel column S2, the third pixel column S3, and the fourth pixel column S4, as the target pixel area.

Optionally, the target pixel area may further include: remaining pixel units 10 on the display panel, in a same column as the central pixel column S0, in the predetermined direction; remaining pixel units 10 on the display panel, in a same column as the first pixel column S1, in the predetermined direction; remaining pixel units 10 on the display panel, in a same column as the second pixel column S2, in the predetermined direction; remaining pixel units 10 on the display panel, in a same column as the third pixel column S3, in the predetermined direction; and remaining pixel units 10 on the display panel, in a same column as the fourth pixel column S4, in the predetermined direction.

Further, the step of determining whether the current grayscale value of each pixel unit 10 in the central pixel column S0 is equal to each other includes: comparing the current grayscale value of the first sub-pixel 101 contained in each pixel unit 10 in the central pixel column S0 with each other; comparing the current grayscale value of the second sub-pixel 102 contained in each pixel unit 10 in the central pixel column S0 with each other; comparing the current grayscale value of the third sub-pixel 103 contained in each pixel unit 10 in the central pixel column S0 with each other; and when the current grayscale value of the first sub-pixel 101 contained in each pixel unit 10 in the central pixel column S0 is equal to each other, and the current grayscale value of the second sub-pixel 102 contained in each pixel unit 10 in the central pixel column S0 is equal to each other, and the current grayscale value of the third sub-pixel 103 contained in each pixel unit 10 in the central pixel column S0 is equal to each other, determining the current grayscale value of each pixel unit 10 in the central pixel column S0 being equal to each other.

Further, the step of determining whether the current grayscale value of each pixel unit 10 in the first pixel column S1 is equal to each other includes: comparing the current grayscale value of the first sub-pixel 101 contained in each pixel unit 10 in the first pixel column S1 with each other; comparing the current grayscale value of the second sub-pixel 102 contained in each pixel unit 10 in the first pixel column S1 with each other; comparing the current grayscale value of the third sub-pixel 103 contained in each pixel unit 10 in the first pixel column S1 with each other; and when the current grayscale value of the first sub-pixel 101 contained in each pixel unit 10 in the first pixel column S1 is equal to each other, and the current grayscale value of the second sub-pixel 102 contained in each pixel unit 10 in the first pixel column S1 is equal to each other, and the current grayscale value of the third sub-pixel 103 contained in each pixel unit 10 in the first pixel column S1 is equal to each other, determining the current grayscale value of each pixel unit 10 in the first pixel column S1 being equal to each other.

Further, the step of determining whether the current grayscale value of each pixel unit 10 in the second pixel column S2 is equal to each other includes: comparing the current grayscale value of the first sub-pixel 101 contained in each pixel unit 10 in the second pixel column S2 with each other; comparing the current grayscale value of the second sub-pixel 102 contained in each pixel unit 10 in the second pixel column S2 with each other; comparing the current grayscale value of the third sub-pixel 103 contained in each pixel unit 10 in the second pixel column S2 with each other; and when the current grayscale value of the first sub-pixel 101 contained in each pixel unit 10 in the second pixel column S2 is equal to each other, and the current grayscale value of the second sub-pixel 102 contained in each pixel unit 10 in the second pixel column S2 is equal to each other, and the current grayscale value of the third sub-pixel 103 contained in each pixel unit 10 in the second pixel column S2 is equal to each other, determining the current grayscale value of each pixel unit 10 in the second pixel column S2 being equal to each other.

Further, the step of determining whether the current grayscale value of each pixel unit 10 in the third pixel column S3 is equal to each other includes: comparing the current grayscale value of the first sub-pixel 101 contained in each pixel unit 10 in the third pixel column S3 with each other; comparing the current grayscale value of the second sub-pixel 102 contained in each pixel unit 10 in the third pixel column S3 with each other; comparing the current grayscale value of the third sub-pixel 103 contained in each pixel unit 10 in the third pixel column S3 with each other; and when the current grayscale value of the first sub-pixel 101 contained in each pixel unit 10 in the third pixel column S3 is equal to each other, and the current grayscale value of the second sub-pixel 102 contained in each pixel unit 10 in the third pixel column S3 is equal to each other, and the current grayscale value of the third sub-pixel 103 contained in each pixel unit 10 in the third pixel column S3 is equal to each other, determining the current grayscale value of each pixel unit 10 in the third pixel column S3 being equal to each other.

Further, the step of determining whether the current grayscale value of each pixel unit 10 in the fourth pixel column S4 is equal to each other includes: comparing the current grayscale value of the first sub-pixel 101 contained in each pixel unit 10 in the fourth pixel column S4 with each other; comparing the current grayscale value of the second sub-pixel 102 contained in each pixel unit 10 in the fourth pixel column S4 with each other; comparing the current grayscale value of the third sub-pixel 103 contained in each pixel unit 10 in the fourth pixel column S4 with each other; and when the current grayscale value of the first sub-pixel 101 contained in each pixel unit 10 in the fourth pixel column S4 is equal to each other, and the current grayscale value of the second sub-pixel 102 contained in each pixel unit 10 in the fourth pixel column S4 is equal to each other, and the current grayscale value of the third sub-pixel 103 contained in each pixel unit 10 in the fourth pixel column S4 is equal to each other, determining the current grayscale value of each pixel unit 10 in the fourth pixel column S4 being equal to each other.

Further, the step of comparing the size relationship between the current grayscale value of anyone pixel unit 10 in the first pixel column S1 and the current grayscale value of anyone pixel unit 10 in the fourth pixel column S4 includes: comparing the current grayscale value of the first sub-pixel 101 contained in anyone pixel unit 10 in the first pixel column S1 with the current grayscale value of the first sub-pixel 101 contained in anyone pixel unit 10 in the fourth pixel column S4; comparing the current grayscale value of the second sub-pixel 102 contained in anyone pixel unit 10 in the first pixel column S1 with the current grayscale value of the second sub-pixel 102 contained in anyone pixel unit 10 in the fourth pixel column S4; comparing the current grayscale value of the third sub-pixel 103 contained in anyone pixel unit 10 in the first pixel column S1 with the current grayscale value of the third sub-pixel 103 contained in anyone pixel unit 10 in the fourth pixel column S4; and when the current grayscale values of the first sub-pixels 101 contained in the pixel units 10 in the first pixel column S1 and the current grayscale values of the first sub-pixels 101 contained in the pixel units 10 in the fourth pixel column S4 are not equal, and the current grayscale values of the second sub-pixels 102 contained in the pixel units 10 in the first pixel column S1 and the current grayscale values of the second sub-pixels 102 contained in the pixel units 10 in the fourth pixel column S4 are not equal, and the current grayscale values of the third sub-pixels 103 contained in the pixel units 10 in the first pixel column S1 and the current grayscale values of the third sub-pixels 103 contained in the pixel units 10 in the fourth pixel column S4 are not equal, determining the current grayscale value of anyone pixel unit

10 in the first pixel column S1 not equal to the current grayscale value of anyone pixel unit 10 in the fourth pixel column S4.

Further, the step of comparing the size relationship between the current grayscale value of anyone pixel unit 10 in the second pixel column S2 and the current grayscale value of anyone pixel unit 10 in the third pixel column S3 includes: comparing the current grayscale value of the first sub-pixel 101 contained in anyone pixel unit 10 in the second pixel column S2 with the current grayscale value of the first sub-pixel 101 contained in anyone pixel unit 10 in the third pixel column S3; comparing the current grayscale value of the second sub-pixel 102 contained in anyone pixel unit 10 in the second pixel column S2 with the current grayscale value of the second sub-pixel 102 contained in anyone pixel unit 10 in the third pixel column S3; comparing the current grayscale value of the third sub-pixel 103 contained in anyone pixel unit 10 in the second pixel column S2 with the current grayscale value of the third sub-pixel 103 contained in anyone pixel unit 10 in the third pixel column S3; and when the current grayscale values of the first sub-pixels 101 contained in the pixel units 10 in the second pixel column S2 and the current grayscale values of the first sub-pixels 101 contained in the pixel units 10 in the third pixel column S3 are not equal, and the current grayscale values of the second sub-pixels 102 contained in the pixel units 10 in the second pixel column S2 and the current grayscale values of the second sub-pixels 102 contained in the pixel units 10 in the third pixel column S3 are not equal, and the current grayscale values of the third sub-pixels 103 contained in the pixel units 10 in the second pixel column S2 and the current grayscale values of the third sub-pixels 103 contained in the pixel units 10 in the third pixel column S3 are not equal, determining the current grayscale value of anyone pixel unit 10 in the second pixel column S2 not equal to the current grayscale value of anyone pixel unit 10 in the third pixel column S3.

For example, when the pixel region T is a pixel matrix area composed of four rows and five columns of pixel units 10, and the predetermined direction is a direction formed at an angle of 135 degrees with the row direction of the pixel units 10 as shown in FIG. 3, the current grayscale values contained in the pixel units in the first pixel column S1, the second pixel column S2, the third pixel column S3, and the fourth pixel column S4 are equal, and the current grayscale value of the pixel unit 10 at the third row and the second column is not equal to the current grayscale value of the pixel unit 10 at the second row and fourth column, and the current grayscale value of the pixel unit 10 at the fourth row and the second column is not equal to the current grayscale value of the pixel unit 10 at the third row and the fourth column, then an area composed of the first pixel column S1, the second pixel column S2, the third pixel column S3, and the fourth pixel column S4, and an area of each pixel column extending in the predetermined direction can be determined as the target pixel area.

In a step S105: the grayscale value of each pixel unit 10 in the target pixel area is adjusted so that the grayscale value of each pixel unit 10 in the target pixel area is equal to one actual grayscale value of a picture to be displayed.

Specifically, for each sub-pixel contained in each pixel unit 10 in the target pixel area, its grayscale value is adjusted to the actual grayscale value of the picture to be displayed.

Namely, view angle compensation (VAC) technology is not adopted to perform grayscale adjustment of the target pixel area, thereby eliminating or alleviating defect of the colored oblique line of the display panel to improve the display quality of the display panel.

Figure 5:
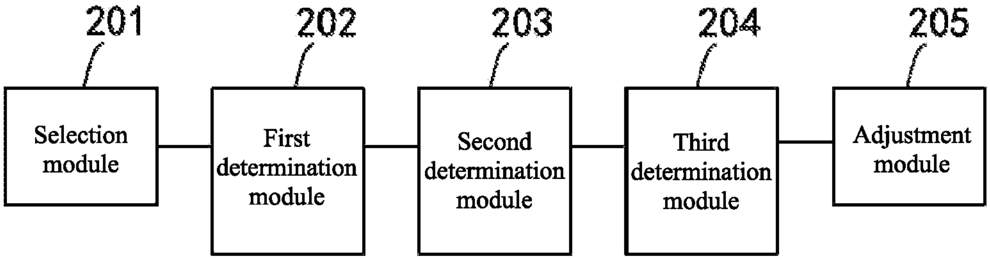
FIG. 5 is a schematic structural diagram of a display compensation device provided by an embodiment of the present disclosure.

Please refer to FIG. 5, an embodiment of the present disclosure also provides a display compensation device. The display compensation device is applied to a display panel and is used to complete the display compensation method provided in the embodiments of the present disclosure. The display panel includes a plurality of pixel units. The display compensation device includes a selection module 201, a first determination module 202, a second determination module 203, a third determination module 204, and an adjustment module 205.

The selection module 201 is used to select a pixel region within the display panel, wherein the pixel region includes a plurality of pixel units.

The first determination module 202 is used to determine a central pixel unit located at a central position of the pixel region.

The second determination module 203 is used to determine a central pixel column including the central pixel unit, a first pixel column and a second pixel column located on opposite sides of the central pixel column, a third pixel column located on one side of the first pixel column away from the central pixel column, and a fourth pixel column located on one side of the second pixel column away from the central pixel column, in a predetermined direction.

The third determination module 204 is used to determine a target pixel area according to grayscale values of the pixel units contained in the central pixel column, the first pixel column, the second pixel column, the third pixel column, and the fourth pixel column.

The adjustment module 205 is used to adjust the grayscale value of each pixel unit in the target pixel area so that the grayscale value of each pixel unit in the target pixel area is equal to one actual grayscale value of a picture to be displayed.

An embodiment of the present disclosure also provides a display panel. The display panel uses the display compensation method provided in the embodiment of the present disclosure for display. Alternatively, the display panel includes the display compensation device provided in the embodiment of the present disclosure. The display panel may be a liquid crystal display panel.

It should be noted that although the present disclosure is disclosed as above in specific embodiments, the embodiments as mentioned above are not intended to limit the present disclosure, and those skilled in the art can make various modifications without departing from the spirit and scope of the present disclosure. Therefore, the protection scope of the present disclosure is subject to the scope defined by the claims.

What is claimed is:

1. A display compensation method, which is applied to a display panel comprising a plurality of pixel units, wherein the display compensation method comprises:

selecting a pixel region within the display panel, wherein the pixel region comprises a part of the plurality of pixel units;

determining a central pixel unit located at a central position of the pixel region;

determining a central pixel column including the central pixel unit, a first pixel column and a second pixel column located on opposite sides of the central pixel column, a third pixel column located on one side of the first pixel column away from the central pixel column, and a fourth pixel column located on one side of the second pixel column away from the central pixel column, in a predetermined direction that forms an angle of 135 degrees or 45 degrees with a row direction of the pixel units;

when current grayscale values of pixel units in the central pixel column are equal to each other, and current grayscale values of pixel units in the first pixel column are equal to each other, and current grayscale values of pixel units in the second pixel column are equal to each other, and current grayscale values of pixel units in the third pixel column are equal to each other, and current grayscale values of pixel units in the fourth pixel column are equal to each other, and when the current grayscale value of anyone pixel unit in the first pixel column and the current grayscale value of anyone pixel unit in the fourth pixel column are not equal, and when the current grayscale value of anyone pixel unit in the second pixel column and the current grayscale value of anyone pixel unit in the third pixel column are not equal, determining, the central pixel column, the first pixel column, the second pixel column, the third pixel column, and the fourth pixel column, as the target pixel area; and adjusting the grayscale value of each pixel unit in the target pixel area so that the grayscale value of each pixel unit in the target pixel area is equal to one actual grayscale value of a picture to be displayed.

2. The display compensation method as claimed in claim 1, wherein the display compensation method comprises:

acquiring a current grayscale value of each pixel unit in the central pixel column; and determining whether the current grayscale value of each pixel unit in the central pixel column is equal to each other.

3. The display compensation method as claimed in claim 2, wherein the display compensation method comprises:

acquiring a current grayscale value of each pixel unit in the first pixel column; and determining whether the current grayscale value of each pixel unit in the first pixel column is equal to each other.

4. The display compensation method as claimed in claim 2, wherein each of the pixel units comprises a first sub-pixel, a second sub-pixel, and a third sub-pixel;

the step of determining whether the current grayscale value of each pixel unit in the central pixel column is equal to each other comprises:

comparing the current grayscale values of the first sub-pixels contained in the central pixel column;

comparing the current grayscale values of the second sub-pixels contained in the central pixel column;

comparing the current grayscale values of the third sub-pixels contained in the central pixel column; and when the current grayscale values of the first sub-pixels contained in the central pixel column are equal to each other, and the current grayscale values of the second sub-pixels contained in the central pixel column are equal to each other, and the current grayscale values of the third sub-pixels contained in the central pixel column are equal to each other, determining the current grayscale values of the pixel units in the central pixel column being equal to each other.

5. The display compensation method as claimed in claim 3, wherein the display compensation method comprises:

acquiring a current grayscale value of each pixel unit in the second pixel column; and determining whether the current grayscale value of each pixel unit in the second pixel column is equal to each other.

6. The display compensation method as claimed in claim 3, wherein each of the pixel units comprises a first sub-pixel, a second sub-pixel, and a third sub-pixel;

the step of determining whether the current grayscale value of each pixel unit in the first pixel column is equal to each other comprises:

comparing the current grayscale values of the first sub-pixels contained in the first pixel column with each other;

comparing the current grayscale values of the second sub-pixels contained in the first pixel column with each other;

comparing the current grayscale values of the third sub-pixels contained in the first pixel column with each other; and when the current grayscale values of the first sub-pixels contained in the first pixel column are equal to each other, and the current grayscale values of the second sub-pixels contained in the first pixel column are equal to each other, and the current grayscale values of the third sub-pixels contained in the first pixel column are equal to each other, determining the current grayscale values of the pixel units in the first pixel column being equal to each other.

7. The display compensation method as claimed in claim 5, wherein the display compensation method comprises:

acquiring a current grayscale value of each pixel unit in the third pixel column; and determining whether the current grayscale value of each pixel unit in the third pixel column is equal to each other.

8. The display compensation method as claimed in claim 5, wherein each of the pixel units comprises a first sub-pixel, a second sub-pixel, and a third sub-pixel;

the step of determining whether the current grayscale value of each pixel unit in the second pixel column is equal to each other comprises:

comparing the current grayscale values of the first sub-pixels contained in the second pixel column with each other;

comparing the current grayscale values of the second sub-pixels contained in the second pixel column with each other;

comparing the current grayscale values of the third sub-pixels contained in the second pixel column with each other; and when the current grayscale values of the first sub-pixels contained in the second pixel column are equal to each other, and the current grayscale values of the second sub-pixels contained in the second pixel column are equal to each other, and the current grayscale values of the third sub-pixels contained in the second pixel column are equal to each other, determining the current grayscale values of the pixel units in the second pixel column being equal to each other.

9. The display compensation method as claimed in claim 7, wherein the display compensation method comprises:

acquiring a current grayscale value of each pixel unit in the fourth pixel column; and determining whether the current grayscale value of each pixel unit in the fourth pixel column is equal to each other.

10. The display compensation method as claimed in claim 7, wherein each of the pixel units comprises a first sub-pixel, a second sub-pixel, and a third sub-pixel;

the step of determining whether the current grayscale value of each pixel unit in the third pixel column is equal to each other comprises:

comparing the current grayscale values of the first sub-pixels contained in the third pixel column with each other;

comparing the current grayscale values of the second sub-pixels contained in the third pixel column with each other;

comparing the current grayscale values of the third sub-pixels contained in the third pixel column with each other; and when the current grayscale values of the first sub-pixels contained in the third pixel column are equal to each other, and the current grayscale values of the second sub-pixels contained in the third pixel column are equal to each other, and the current grayscale values of the third sub-pixels contained in the third pixel column are equal to each other, determining the current grayscale values of the pixel units in the third pixel column being equal to each other.

11. The display compensation method as claimed in claim 9, wherein the display compensation method comprises:

when the current grayscale value of each pixel unit in the central pixel column is equal to each other, and the current grayscale value of each pixel unit in the first pixel column is equal to each other, and the current grayscale value of each pixel unit in the second pixel column is equal to each other, and the current grayscale value of each pixel unit in the third pixel column is equal to each other, and the current grayscale value of each pixel unit in the fourth pixel column is equal to each other, comparing a size relationship between the current grayscale value of anyone pixel unit in the first pixel column and the current grayscale value of anyone pixel unit in the fourth pixel column; and comparing a size relationship between the current grayscale value of anyone pixel unit in the second pixel column and the current grayscale value of anyone pixel unit in the third pixel column.

12. The display compensation method as claimed in claim 9, wherein each of the pixel units comprises a first sub-pixel, a second sub-pixel, and a third sub-pixel;

the step of determining whether the current grayscale value of each pixel unit in the fourth pixel column is equal to each other comprises:

comparing the current grayscale values of the first sub-pixels contained in the fourth pixel column with each other;

comparing the current grayscale values of the second sub-pixels contained in the fourth pixel column with each other;

comparing the current grayscale values of the third sub-pixels contained in the fourth pixel column with each other; and when the current grayscale values of the first sub-pixels contained in the fourth pixel column are equal to each other, and the current grayscale values of the second sub-pixels contained in the fourth pixel column are equal to each other, and the current grayscale values of the third sub-pixels contained in the fourth pixel column are equal to each other, determining the current grayscale values of the pixel units in the fourth pixel column being equal to each other.

13. The display compensation method as claimed in claim 11, wherein each of the pixel units comprises a first sub-pixel, a second sub-pixel, and a third sub-pixel;

the step of comparing the size relationship between the current grayscale value of anyone pixel unit in the first pixel column and the current grayscale value of anyone pixel unit in the fourth pixel column comprises:

comparing the current grayscale value of the first sub-pixel contained in anyone pixel unit in the first pixel column with the current grayscale value of the first sub-pixel contained in anyone pixel unit in the fourth pixel column;

comparing the current grayscale value of the second sub-pixel contained in anyone pixel unit in the first pixel column with the current grayscale value of the second sub-pixel contained in anyone pixel unit in the fourth pixel column; and comparing the current grayscale value of the third sub-pixel contained in anyone pixel unit in the first pixel column with the current grayscale value of the third sub-pixel contained in anyone pixel unit in the fourth pixel column.

14. The display compensation method as claimed in claim 13, wherein the step of comparing the size relationship between the current grayscale value of anyone pixel unit in the first pixel column and the current grayscale value of anyone pixel unit in the fourth pixel column further comprises:

when the current grayscale values of the first sub-pixels contained in the pixel units in the first pixel column and the current grayscale values of the first sub-pixels contained in the pixel units in the fourth pixel column are not equal, and the current grayscale values of the second sub-pixels contained in the pixel units in the first pixel column and the current grayscale values of the second sub-pixels contained in the pixel units in the fourth pixel column are not equal, and the current grayscale values of the third sub-pixels contained in the pixel units in the first pixel column and the current grayscale values of the third sub-pixels contained in the pixel units in the fourth pixel column are not equal, determining the current grayscale value of anyone pixel unit in the first pixel column not equal to the current grayscale value of anyone pixel unit in the fourth pixel column.

15. The display compensation method as claimed in claim 11, wherein each of the pixel units comprises a first sub-pixel, a second sub-pixel, and a third sub-pixel;

the step of comparing the size relationship between the current grayscale value of anyone pixel unit in the second pixel column and the current grayscale value of anyone pixel unit in the third pixel column comprises:

comparing the current grayscale value of the first sub-pixel contained in anyone pixel unit in the second pixel column with the current grayscale value of the first sub-pixel contained in anyone pixel unit in the third pixel column;

comparing the current grayscale value of the second sub-pixel contained in anyone pixel unit in the second pixel column with the current grayscale value of the second sub-pixel contained in anyone pixel unit in the third pixel column; and comparing the current grayscale value of the third sub-pixel contained in anyone pixel unit in the second pixel column with the current grayscale value of the third sub-pixel contained in anyone pixel unit in the third pixel column.

16. The display compensation method as claimed in claim 15, wherein the step of comparing the size relationship between the current grayscale value of anyone pixel unit in the second pixel column and the current grayscale value of anyone pixel unit in the third pixel column further comprises:

when the current grayscale values of the first sub-pixels contained in the pixel units in the second pixel column and the current grayscale values of the first sub-pixels contained in the pixel units in the third pixel column are not equal, and the current grayscale values of the second sub-pixels contained in the pixel units in the second pixel column and the current grayscale values of the second sub-pixels contained in the pixel units in the third pixel column are not equal, and the current grayscale values of the third sub-pixels contained in the pixel units in the second pixel column and the current grayscale values of the third sub-pixels contained in the pixel units in the third pixel column are not equal, determining the current grayscale value of anyone pixel unit in the second pixel column not equal to the current grayscale value of anyone pixel unit in the third pixel column.

17. A display panel, which is configured to perform a display process using the display compensation method as claimed in claim 1.

18. The display panel as claimed in claim 17, wherein the display panel comprises a plurality of pixel units, and each of the pixel units comprises a first sub-pixel, a second sub-pixel, and a third sub-pixel.

19. A display compensation device, which is applied to a display panel comprising a plurality of pixel units, wherein the display compensation device comprises:

a selection module configured to select a pixel region within the display panel, wherein the pixel region comprises a part of the plurality of pixel units;

a first determination module configured to determine a central pixel unit located at a central position of the pixel region;

a second determination module configured to determine a central pixel column including the central pixel unit, a first pixel column and a second pixel column located on opposite sides of the central pixel column, a third pixel column located on one side of the first pixel column away from the central pixel column, and a fourth pixel column located on one side of the second pixel column away from the central pixel column, in a predetermined direction that forms an angle of 135 degrees or 45 degrees with a row direction of the pixel units;

a third determination module configured to determine the central pixel column, the first pixel column, the second pixel column, the third pixel column, and the fourth pixel column, as the target pixel area, when current grayscale values of pixel units in the central pixel column are equal to each other, and current grayscale values of pixel units in the first pixel column are equal to each other, and current grayscale values of pixel units in the second pixel column are equal to each other, and current grayscale values of pixel units in the third pixel column are equal to each other, and current grayscale values of pixel units in the fourth pixel column are equal to each other, and when the current grayscale value of anyone pixel unit in the first pixel column and the current grayscale value of anyone pixel unit in the fourth pixel column are not equal, and when the current grayscale value of anyone pixel unit in the second pixel column and the current grayscale value of anyone pixel unit in the third pixel column are not equal; and an adjustment module configured to adjust the grayscale value of each pixel unit in the target pixel area so that the grayscale value of each pixel unit in the target pixel area is equal to one actual grayscale value of a picture to be displayed.

* * * * *